United States Patent [19]

Esbroeck

[11] Patent Number: 5,060,596

[45] Date of Patent: Oct. 29, 1991

[54] METHOD FOR FILLING A CONTAINER FOR TRANSPORTATION OF LIVE POULTRY, AND CONTAINER FOR CARRYING OUT THE METHOD

[75] Inventor: Maurice E. T. Esbroeck, Nijmegen, Netherlands

[73] Assignee: Stork PMT B.V., Boxmeer, Netherlands

[21] Appl. No.: 484,377

[22] Filed: Feb. 23, 1990

[30] Foreign Application Priority Data

Feb. 24, 1989 [NL] Netherlands .......................... 8900470

[51] Int. Cl.⁵ .............................................. A01K 31/07
[52] U.S. Cl. ....................................... 119/17; 206/503
[58] Field of Search ........................ 119/17, 19, 21, 2; 206/503

[56] References Cited

U.S. PATENT DOCUMENTS

| | | | |
|---|---|---|---|
| 3,695,232 | 10/1972 | Frank | 119/17 |
| 3,774,577 | 11/1973 | Sanders | 119/17 |
| 3,797,460 | 3/1974 | Blankenship | 119/17 |

FOREIGN PATENT DOCUMENTS 8005146 9/1980 Netherlands .
8005345 9/1980 Netherlands .

Primary Examiner—John G. Weiss
Attorney, Agent, or Firm—Hurt, Richardson, Garner, Todd & Cadenhead

[57] ABSTRACT

A method for filling a container which is used for the transportation of live poultry from a breeding farm to a slaughterhouse is described, as well as a container to be used with said method. The container is divided into compartments, one on top of the other. Prior to the filling of a compartment with poultry, the bottom face of the compartment lying above it, together with the side face thereof, is moved away fully or partially. Said side face is lying at the filling side of the container. The container is constructed in such a way that the poultry can meet no obstacles at the filling side above the compartment to be filled. Moving away said bottom and side faces may be performed by sliding them away sideways or by flapping them up.

4 Claims, 4 Drawing Sheets

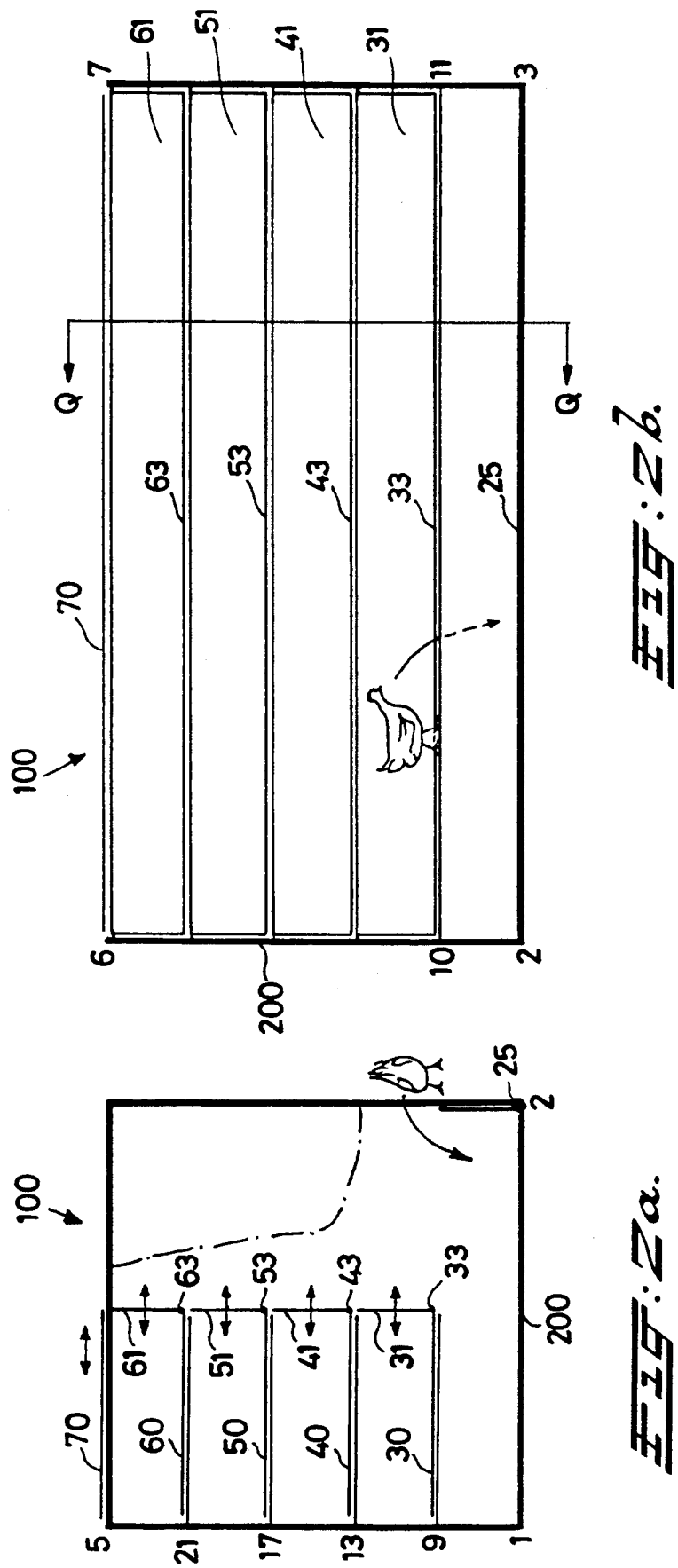

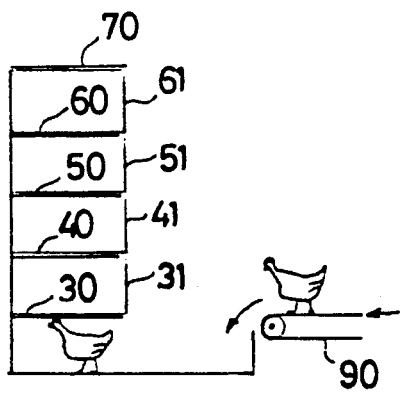
FIG:3a.
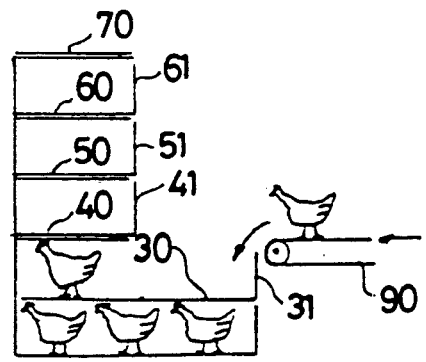
FIG:3b.
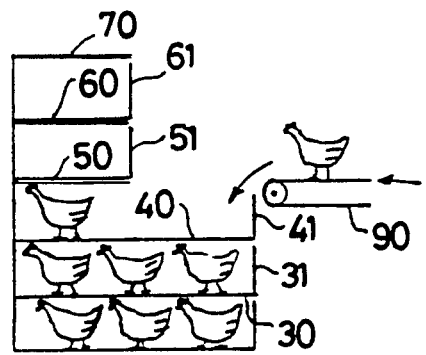
FIG:3c.
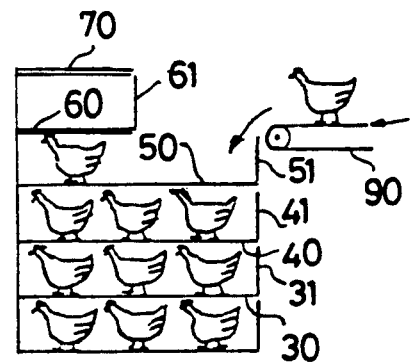
FIG:3d.
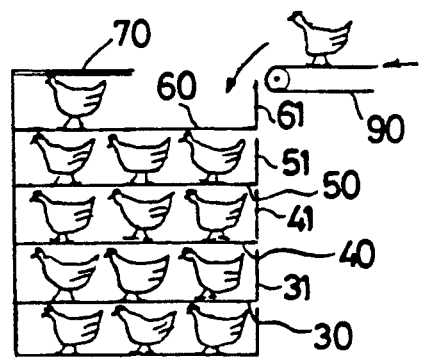
FIG:3e.
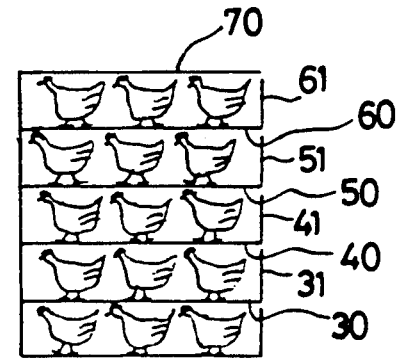
FIG:3f.

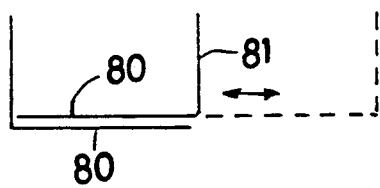
FIG:4a.
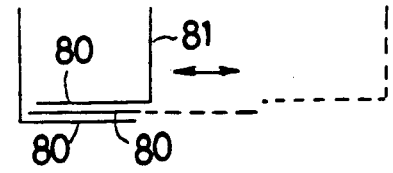
FIG:4b.
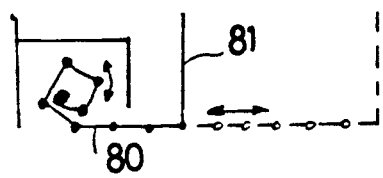
FIG:5.

METHOD FOR FILLING A CONTAINER FOR TRANSPORTATION OF LIVE POULTRY, AND CONTAINER FOR CARRYING OUT THE METHOD

BACKGROUND OF THE INVENTION

This invention relates to a method for filling a container with live poultry, said container being divided into a number of compartments of which, with the exception of the bottom compartment, the bottom face of each compartment forms the top face of each compartment lying below it, and in which prior to the filling the bottom face(s) is (are) moved in such a way that one or more compartments lying below become accessible. The invention also relates to a container for such poultry and to a container for carrying out the method.

DISCUSSION OF THE PRIOR ART

For the transportation of live poultry, for example chickens, from breeding farm to slaughterhouse containers specially equipped for this purpose are used. These containers have been made suitable for transportation by lorry and are provided with means for moving the container itself, for example by forklift truck. These containers have to be constructed in such a way that they can be filled, transported and emptied quickly and efficiently. It is known per se that these containers are divided into compartments which are high enough for the poultry to be able to stand in them, and are long and wide enough to accommodate a plurality of birds.

Such a container is described in U.S. Pat. No. 3 797 460. According to one embodiment of this container, the top faces of all compartments, which — with the exception of the top compartment — also form the bottom faces of the compartments lying above them, are hingedly connected to the container at one side, so that they can be placed in a virtually vertical position by raising them. When the containers are being filled with poultry, first of all, all top faces are placed in the virtually vertical position, so that the bottom compartment can be filled with poultry from the top side of the container. In the method, the birds fall down over a number of compartment heights. When the bottom compartment is full, its top face is lowered to the horizontal position and the following compartment is filled from the top side of the container again. When this compartment is full, its top face is lowered to the horizontal position, and the next compartment is filled. This method is continued until the whole container is full.

A disadvantage of the above described method in connection with the construction of the container is that during filling of the low-lying compartments the birds make a considerable free fall, which means that they are exposed to an inordinate degree of stress, and furthermore injuries, broken legs and even death of birds can occur. The injured birds are unsuitable for processing in the slaughterhouse, which means an economic disadvantage.

SUMMARY OF THE INVENTION

Object of the invention is to provide a method which does not have said drawback, and is particularly efficient, causes little stress among the birds, and minimizes the risk of injuries. This object is attained by moving away, prior to the filling of a compartment, the bottom face of at least the compartment lying above it, together with the side face thereof facing the filling side, fully or partially from the filling side of the container.

Another object of the invention is to provide a container which can be used to carry out the method according to the invention, which container is preferably designed in such a way that the container wall is free of obstacles at the filling side above the compartment to be filled.

During filling of a container according to the invention with poultry by the method according to the invention, first of all, the bottom face is moved together with the side face of all compartments, apart from the bottom one, fully or partially sideways or upwards. The top face of the container may also be moved fully or partially. The bottom compartment is then filled with poultry from the container filling side, from a height which corresponds essentially to the height of the side face. In this method the birds do not meet with any obstacles and fall down over only one compartment height. When the bottom compartment is full, the bottom face together with the side face of the compartment lying above it is then returned to the initial position. This second compartment is again filled with poultry from the container filling side, and here again the birds cannot meet with any obstacles and again fall down over only one compartment height.

The remaining compartments are filled in the same way, the top face of the top compartment being closed when it is full.

Since the container is emptied in the usual manner, namely by placing the container at an angle, following which the birds leave the container through a side wall, a side face of each compartment is, for example, hingedly connected to the bottom face, not necessarily the same as the above mentioned side face.

Other features and advantages will be more readily appreciated by reference to the following description taken in conjunction with the accompanying drawings in which like reference numerals designate like parts with like functions.

DESCRIPTION OF THE DRAWINGS

FIGS. 2a and 2b schematically show an exploded side view and front view respectively of a preferred embodiment of a container according to the invention;

FIGS. 3a to 3f show the different phases of filling the container according to FIG. 2;

FIG. 4a again in side view and schematically shows the layout according to FIG. 2;

FIG. 4b shows a variant thereof;

FIG. 5 schematically shows a seventh embodiment.

DESCRIPTION OF THE PREFERRED EMBODIMENTS

Figure 1:
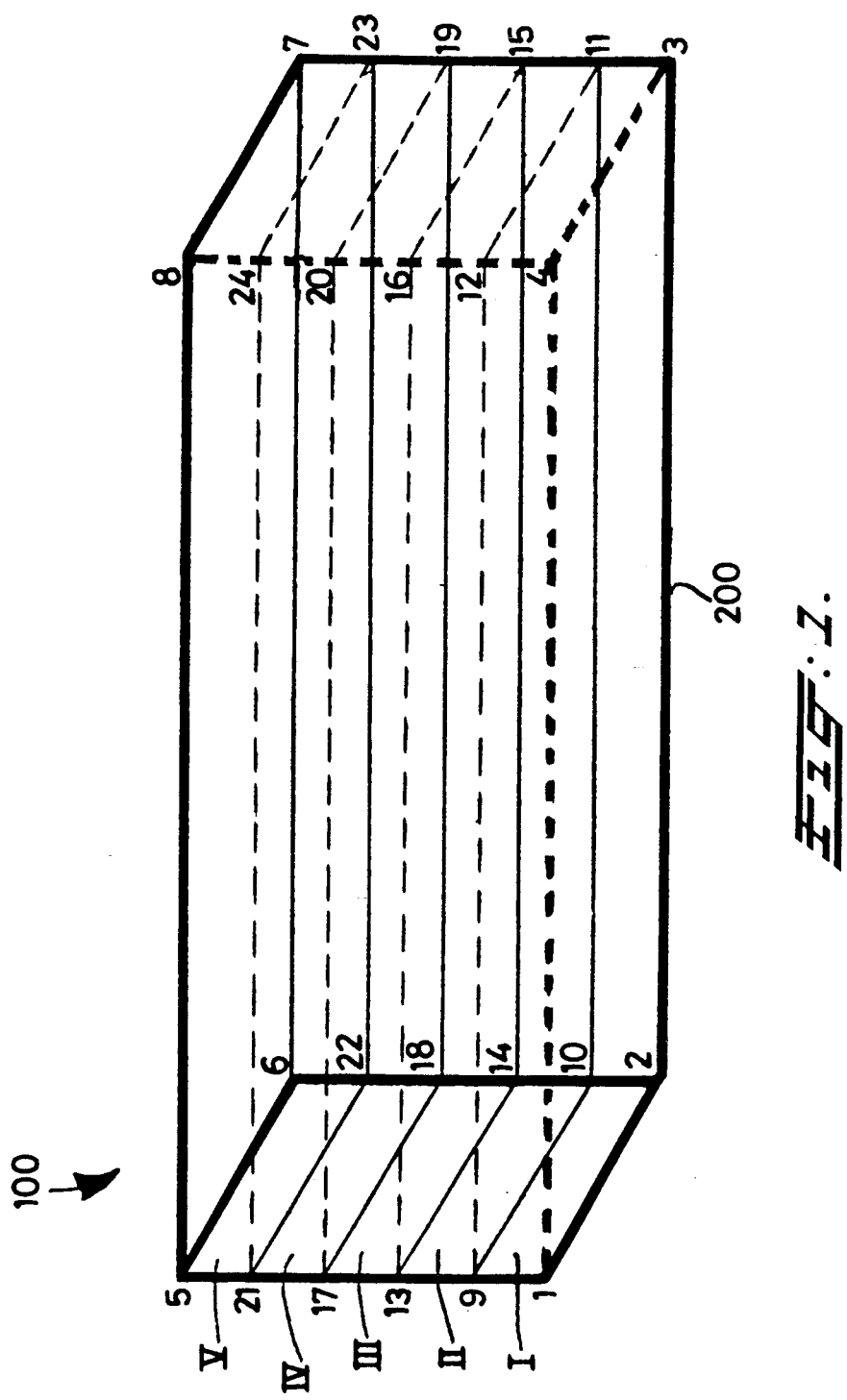
FIG. 1 schematically shows a perspective view of a container according to the present invention.

FIG. 1 schematically shows the layout of a rectangular container 100 according to the present invention. Hidden lines are indicated by a dashed line. The base of the container is formed by a frame 200, indicated by a thick line, and made up of ribs 1-2, 2-3, 3-4, 1-4, 1-5, 2-6, 3-7, 4-8, 5-6, 7-8 and 5-8, connected at the ends. By way of example, the frame 200 is divided into five rectangular compartments I-V which are disposed one above the other, and which are situated between the respective corner points 1-2-3-4-9-10-11-12, 9-10-11-12-13-14-15-16, 13-14-15-16-17-18-19-20, 17-18-19-20-21-22-23-24 and 21-22-23-24-5-6-7-8. The compartments can in turn be subdivided into subcompartments.

Each compartment has four side faces (in the case of compartment I these are the faces with corner points 1-2-9-10, 2-3-10-11, 3-4-11-12 and 1-4-9-12), a bottom face (in the case of compartment I this is the face with corner points 1-2-3-4), and a top face (in the case of compartment I this is the face with corner points (9-10-11-12). The top face of a compartment is at the same time the bottom face of the compartment lying above it, insofar as there is one. Each face of each compartment is fully or partially closed, in such a way that it is impossible for the birds to put any parts of their body through any openings in the face, and this prevents compartments lying below from being soiled with droppings.

During loading of the container 100 with poultry, compartment I is filled first, then compartment II, etc., until the container is full.

FIG. 2a schematically shows a side view, and FIG. 2b schematically shows a front view of a preferred embodiment of a container according to the invention in a position in which the bottom compartment is being filled with poultry.

In FIGS. 2a and 2b halves of the bottom faces 30, 40, 50, 60 of the top four compartments and the respective side faces 31, 41, 51, 61 connected thereto are slid aside. The sliding directions are indicated by a double arrow. Half of the top face 70 of the top compartment is also slid aside.

The connections between (the part of) the bottom face and a side face connected thereto of each compartment can be provided with respective hinging line connections 25, 33, 43, 53, 63, so that when the container is being emptied the poultry can leave the container through the side wall 2-3-6-7 (FIG. 2).

FIGS. 3a to 3f illustrate the filling of the compartments of the container according to FIG. 2, of which a cross-section perpendicular to the plane of drawing at the line Q—Q is shown. First of all, the bottom compartment is filled by bringing in chickens by means of a conveyor belt 90 at the same level as the side face, which is illustrated in FIG. 3a. After filling of the bottom compartment, half of the bottom face 30, together with the side face 31, is slid to the right and fixed. The compartment lying above it is then filled, which is illustrated in FIG. 3b, following which half of the bottom face 40, together with the side face 41, is slid to the right and fixed.

The compartment lying above it is then filled, which is illustrated in FIG. 3c, after which half of the bottom face 50, together with the side face 51, is slid to the right and fixed.

FIGS. 3d and 3e illustrate similar action to those mentioned above. After filling of the top compartment, which is illustrated in FIG. 3e, half of the top face 70 is slid to the right and fixed, which is illustrated in FIG. 3f, following which the container is ready for transportation.

FIGS. 4a, 4b and 5 show in side view by way of example different solutions for full or partial removal of the bottom face together with a side face of a compartment according to the invention.

In the above-mentioned FIG. 5 a filled circle represents a hinge line perpendicular to the plane of drawing at the place which is taken up during filling of a compartment lying below, and an unfilled circle represents the same hinge line in the filled state of the container. This applies mutatis mutandis to the faces of the compartments shown by solid and dashed lines respectively in FIGS. 4a, 4b and 5.

FIG. 4a, in which 80 represents (a part of) the bottom face and 81 a side face of a compartment, again shows the embodiment according to FIG. 2a, and FIG. 4b a variant with a larger number of divisions of the bottom face.

FIG. 5 shows an embodiment in which the bottom face is sub-divided into strips by means of a large number of hinge lines in such a way that the bottom face can be moved sideways by means of rolling up.

In FIGS. 1-3 the container is always shown comprising five compartments, as is customary in the United States of America. Of course, the containers can also comprise a different number of compartments, for example four, as is customary in Europe.

The frame 200 of the container can be made of wood or plastic, but it is preferably made of metal, for example of tubular aluminum sections. The bottom face of each compartment and the side face thereof at the filling side of the container are made of, for example, a perforated metal or plastic plate. The walls of the container, with the exception of the top wall, the side wall at the filling side and the side wall at the emptying side, are provided with, for example, a fine wire mesh.

The container can be filled by hand or by a fully or partially mechanized method, for example using a conveyor belt. The removal or replacement of the bottom and side faces of the compartments can also be manual or motor-driven.

The containers are placed, for example, two at a time on a lorry for transportation.

What is claimed is:

1. A container for live poultry, said container being divided into a number of compartments lying one on top of the other, the compartments comprising a bottom face, a top face and four side faces, the bottom face of each compartment, with the exception of the bottom compartment, forming the top face of each compartment lying below it, and in which container prior to the filling of the container with poultry, the bottom face(s) can be moved in such a way that one or more compartments lying below become accessible, wherein the bottom face of at least one compartment lying above the compartment to be filled, together with the side face thereof facing a filling side, can be slid away sideways at least partially, as a whole or in parts, together with the side face.

2. A container according to claim 1, wherein the container side wall at the filling side is free of obstacles above the compartment to be filled.

3. A container according to claim 2, comprising a side face which is hingedly connected to the bottom face and can be opened during unloading of the container.

4. A container according to claim 1, comprising a side face which is hingedly connected to the bottom face and can be opened during unloading of the container.

* * * * *